US012595071B1

(12) United States Patent
Eadie et al.

(10) Patent No.: US 12,595,071 B1
(45) Date of Patent: Apr. 7, 2026

(54) PARALLEL HYBRID ELECTRIC VERTICAL TAKEOFF AND LANDING AIRCRAFT

(71) Applicant: Lockheed Martin Corporation, Bethesda, MD (US)

(72) Inventors: William J. Eadie, Cheshire, CT (US); Michael Strauss, Stratford, CT (US); Igor Cherepinsky, Stratford, CT (US); Vladimir Blasko, Stratford, CT (US); Emre Gurpinar, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/983,002

(22) Filed: Dec. 16, 2024

(51) Int. Cl.
| | |
|---|---|
| *B64D 31/18* | (2024.01) |
| *B64C 27/06* | (2006.01) |
| *B64C 27/12* | (2006.01) |
| *B64D 27/33* | (2024.01) |

(52) U.S. Cl.
CPC ............ *B64D 31/18* (2024.01); *B64D 27/33* (2024.01); *B64C 27/06* (2013.01); *B64C 27/12* (2013.01)

(58) Field of Classification Search
CPC ........ B64D 31/18; B64D 27/06; B64D 27/12; B64D 27/33
See application file for complete search history.

(56) References Cited

U.S. PATENT DOCUMENTS

| | | | |
|---|---|---|---|
| 8,543,262 | B1 | 9/2013 | Gehrke et al. |
| 8,757,542 | B2 | 6/2014 | Hopdjanian et al. |

| | | | |
|---|---|---|---|
| 8,870,114 | B2 | 10/2014 | Botti et al. |
| 8,939,399 | B2 | 1/2015 | Kouros et al. |
| 9,008,942 | B2 | 4/2015 | Dyrla et al. |
| 9,045,223 | B2 | 6/2015 | Connaulte et al. |
| 9,162,771 | B2 | 10/2015 | Roggemans et al. |

(Continued)

FOREIGN PATENT DOCUMENTS

| | | |
|---|---|---|
| CN | 108238247 A | 7/2018 |
| CN | 109204797 A | 1/2019 |

(Continued)

*Primary Examiner* — Timothy D Collins
*Assistant Examiner* — Justin Michael Heston
(74) *Attorney, Agent, or Firm* — Michael Best & Friedrich LLP

(57) ABSTRACT

A vertical takeoff and landing aircraft, includes a main rotor system, a gearbox mechanically connected to the main rotor system, a first gas turbine engine mechanically connected to the gearbox, a first electrical motor-generator mechanically connected to the first gas turbine engine and mechanically connected to the gearbox, a second electrical motor-generator mechanically connected to the gearbox, a third electrical motor electrically connected to the second electrical motor-generator and mechanically connected to an anti-torque device, the third electrical motor configured to provide mechanical power to the anti-torque device, and a plurality of power-controller interface units. The plurality of power-controller interface units are configured to, during a first phase of flight, control the first gas turbine engine and the first electrical motor-generator to provide mechanical power to the gearbox, and control the second electrical motor-generator to provide electrical power to the third electrical motor.

20 Claims, 12 Drawing Sheets

(56) References Cited

U.S. PATENT DOCUMENTS

| | | | |
|---|---|---|---|
| 9,193,451 B2 | 11/2015 | Salyer | |
| 9,193,453 B2 | 11/2015 | Vallart et al. | |
| 9,248,908 B1 | 2/2016 | Luyks | |
| 9,425,670 B2 | 8/2016 | Mariotto | |
| 9,447,734 B2 | 9/2016 | Mariotto et al. | |
| 9,499,277 B2 | 11/2016 | Chantriaux et al. | |
| 9,677,466 B2 | 6/2017 | Smaoui et al. | |
| 9,982,758 B2 | 5/2018 | Beddok et al. | |
| 10,006,375 B1 | 6/2018 | Wagner et al. | |
| 10,151,246 B2 | 12/2018 | Poumarede et al. | |
| 10,214,296 B2 | 2/2019 | Mercier-calvairac et al. | |
| 10,301,035 B2 | 5/2019 | Bedrine et al. | |
| 10,337,409 B2 | 7/2019 | Bedrine et al. | |
| 10,435,169 B2 | 10/2019 | Steinwandel et al. | |
| 10,569,892 B2 | 2/2020 | Simonetti et al. | |
| 10,633,104 B2 | 4/2020 | Miller et al. | |
| 10,710,735 B2 | 7/2020 | Murrow | |
| 10,730,633 B2 | 8/2020 | Anghel et al. | |
| 10,737,795 B2 | 8/2020 | Moulon et al. | |
| 10,800,536 B2 | 10/2020 | Wagner et al. | |
| 10,906,656 B2 | 2/2021 | Gilliland et al. | |
| 10,926,874 B2 | 2/2021 | Giannini et al. | |
| 10,934,008 B2 | 3/2021 | Vondrell et al. | |
| 11,001,384 B2 | 5/2021 | Schank | |
| 11,001,390 B2 | 5/2021 | Kuster | |
| 11,161,603 B2 | 11/2021 | Vallart et al. | |
| 11,267,579 B2 | 3/2022 | Ross et al. | |
| 11,273,920 B2 | 3/2022 | Gazzino et al. | |
| 11,408,340 B2 | 8/2022 | Lefebvre | |
| 11,440,649 B2 | 9/2022 | Stamps et al. | |
| 11,479,348 B2 | 10/2022 | Gons | |
| 11,603,203 B2 | 3/2023 | Fenny et al. | |
| 11,708,868 B2 | 7/2023 | Olson et al. | |
| 11,724,816 B2 | 8/2023 | Weekes | |
| 11,731,772 B2 | 8/2023 | Fenny et al. | |
| 11,787,532 B2 | 10/2023 | Piccone | |
| 11,787,551 B1 | 10/2023 | Graves et al. | |
| 11,794,886 B2 | 10/2023 | Barais et al. | |
| 11,846,198 B2 | 12/2023 | Vive et al. | |
| 11,852,023 B2 | 12/2023 | Bedrine et al. | |
| 11,852,084 B2 | 12/2023 | Gomez | |
| 11,891,960 B2 | 2/2024 | Park | |
| 2012/0025032 A1* | 2/2012 | Hopdjanian | B64C 27/12 |
| | | | 903/905 |
| 2016/0237917 A1 | 8/2016 | Marconi et al. | |
| 2019/0118943 A1 | 4/2019 | Machin et al. | |
| 2020/0108919 A1 | 4/2020 | Sada et al. | |
| 2021/0229826 A1 | 7/2021 | Mercier et al. | |
| 2021/0237887 A1 | 8/2021 | Besse et al. | |
| 2021/0362869 A1 | 11/2021 | Lafargue et al. | |
| 2022/0081122 A1 | 3/2022 | Gazzino | |
| 2022/0135239 A1 | 5/2022 | Cossetti et al. | |
| 2022/0185489 A1 | 6/2022 | Thiriet et al. | |
| 2022/0234744 A1 | 7/2022 | Botti et al. | |
| 2022/0250758 A1* | 8/2022 | Devendorf | B64D 29/02 |
| 2022/0297846 A1 | 9/2022 | Mark et al. | |
| 2022/0388673 A1 | 12/2022 | Thiriet et al. | |
| 2023/0036129 A1 | 2/2023 | Obrist | |
| 2023/0192279 A1 | 6/2023 | Geneix et al. | |
| 2023/0323787 A1 | 10/2023 | Vive et al. | |
| 2023/0348053 A1 | 11/2023 | Clark et al. | |
| 2023/0391449 A1 | 12/2023 | Tomimatsu | |
| 2024/0025552 A1 | 1/2024 | Cerqueira | |
| 2025/0027425 A1* | 1/2025 | Philbrick | B64D 31/18 |
| 2025/0101909 A1* | 3/2025 | Freer | F01D 15/10 |

FOREIGN PATENT DOCUMENTS

| | | |
|---|---|---|
| CN | 109278996 A | 1/2019 |
| CN | 109335003 A | 2/2019 |
| CN | 109383782 A | 2/2019 |
| CN | 109383783 A | 2/2019 |
| CN | 109383785 A | 2/2019 |
| CN | 109383787 A | 2/2019 |
| CN | 109606701 A | 4/2019 |
| CN | 109383786 B | 5/2022 |
| CN | 109398690 B | 9/2022 |
| CN | 109455294 B | 12/2022 |
| CN | 116986000 A | 11/2023 |
| EP | 2148066 B1 | 8/2011 |
| EP | 2327625 B1 | 3/2012 |
| EP | 2631174 B1 | 3/2017 |
| EP | 3125343 B1 | 5/2018 |
| EP | 3696084 A1 | 8/2020 |
| EP | 4015377 A1 | 6/2022 |
| EP | 4259521 A1 | 10/2023 |
| FR | 3095191 B1 | 4/2021 |
| FR | 3106570 B1 | 2/2024 |
| WO | 2022214757 A1 | 10/2022 |
| WO | 2022234210 A1 | 11/2022 |
| WO | 2022263136 A1 | 12/2022 |
| WO | 2023166256 A1 | 9/2023 |
| WO | 2022123158 A1 | 10/2023 |
| WO | 2024023413 A1 | 2/2024 |
| WO | 2024023445 A1 | 2/2024 |

* cited by examiner

FCC = FLIGHT CONTROL
COMPUTER
ICC =
INVERTER/CONVERTER/
CONTROLLER
MG =
MOTOR/GENERATOR

PARALLEL HYBRID ELECTRIC VERTICAL TAKEOFF AND LANDING AIRCRAFT

FIELD

The present disclosure relates to aircraft powerplants and, more particularly, to hybrid-electric powerplants for vertical takeoff and landing aircraft.

BACKGROUND

Conventional vertical takeoff and landing (VTOL) aircraft, such as rotorcraft, typically utilize mechanically driven rotor systems powered by internal combustion engines, such as gas turbine engines. These engines may provide shaft power to the rotors via reduction gearboxes and/or driveshafts. Gas turbine engines typically operate more efficiently near their maximum power levels because this operating range may allow engine components—such as compressor and/or turbine stages—to function at optimal pressure and temperature ratios, maximizing the efficiency of converting fuel energy into mechanical power. Thus, operating near the gas turbine engine's maximum power level may result in lower specific fuel consumption, meaning less fuel may be required per unit of power produced, which may make the engine more fuel-efficient than when operating at lower power settings.

The maximum power output of gas turbine engines may be determined by peak power requirements of the aircraft, such as during takeoff or hover phases of flight. During these phases, the aircraft may rely heavily on the main rotor system to generate the required lift. Thus, the rotor blades may need to operate at high angles of attack, leading to significant induced drag and power required. By contrast, during cruise, the aircraft's forward motion combines with the rotor blades' rotation, increasing the relative wind speed across the blades. This increased relative wind speed may allow the blades to produce the necessary lift at lower angles of attack, reducing induced drag. Consequently, the power requirements during takeoff or hover are typically greater than during cruise.

Multi-engine rotorcraft may also be subject to a One Engine Inoperative (OEI) power requirement. This requirement mandates that, in the event of an engine failure, the remaining engine(s) should produce sufficient lift to maintain safe flight, providing time for an operator such as the pilot to stabilize the aircraft and/or prepare for an emergency landing. Meeting the OEI condition may necessitate that the operational engine(s) generate enough power to not only support the aircraft's weight, but also to compensate for the sudden loss of power from the failed engine.

However, sizing gas turbine engines to meet the higher power demands of shorter-duration events such as takeoff, hover, and engine failure can reduce the overall efficiency of the aircraft. This is because gas turbine engines sized to meet the power requirements of these shorter periods may operate at lower, less efficient power levels during longer-duration cruise phases, leading to increased fuel consumption and higher operational costs. This mismatch between engine capacity and typical cruise requirements may result in gas turbine engines not being optimized for the most common and extended flight conditions, such as cruise.

Additionally, rotorcraft, particularly helicopters, may require anti-torque devices such as tail rotors to maintain control and stability. The main rotor generates lift but may also create a reactive torque that causes the fuselage to spin in the opposite direction. Anti-torque devices counteract this effect by generating a sideward force offset from the main rotor shaft to create a restoring moment, ensuring that the helicopter remains stable and controllable. Tail rotors, which are typically driven by power from the main powerplant transmitted through driveshafts and/or reduction gearboxes, are a common solution. However, transmitting mechanical power to the tail rotor introduces inefficiencies due to transmission losses and/or additional weight from these components.

SUMMARY

Systems, apparatuses, methods, and techniques described in this specification provide solutions to these and other technical challenges by integrating an electric motor system powered by a secondary power source (such as, for example, a battery) into the powerplant. This system supplements the power requirements during high-demand phases like takeoff, hover, and/or engine failure, allowing the gas turbine engines of the powerplant to be optimized for cruise conditions. Sizing engines for cruise allows them to operate closer to their peak thermal efficiency during the longest phase of flight, significantly improving fuel efficiency and reducing energy-related operating costs. Additionally, smaller engines have lower acquisition and maintenance costs, which may further reduce the aircraft's overall operating expenses. Moreover, in various implementations, electric motors may be used for anti-torque functions, eliminating the need for mechanical power transmission from the gas turbine engines to the tail rotor via the driveshaft and/or tail rotor gearbox, thereby removing associated transmission losses and weight penalties associated with the additional components.

According to some examples, a vertical takeoff and landing aircraft, includes a main rotor system, a gearbox mechanically connected to the main rotor system, a first gas turbine engine mechanically connected to the gearbox, a first electrical motor-generator mechanically connected to the first gas turbine engine and mechanically connected to the gearbox, a second electrical motor-generator mechanically connected to the gearbox, a third electrical motor electrically connected to the second electrical motor-generator and mechanically connected to an anti-torque device, the third electrical motor configured to provide mechanical power to the anti-torque device, and a plurality of power-controller interface units. The plurality of power-controller interface units are configured to, during a first phase of flight, control the first gas turbine engine and the first electrical motor-generator to provide mechanical power to the gearbox, and control the second electrical motor-generator to provide electrical power to the third electrical motor.

Other examples, embodiments, features, and aspects will become apparent by consideration of the detailed description and accompanying drawings.

BRIEF DESCRIPTION OF THE DRAWINGS

In the drawings, reference numbers may be reused to identify similar and/or identical elements.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings. In some operable embodiments according to the disclosure, the drawings are to scale, although not-to-scale embodiments are also contemplated.

Figure 1:
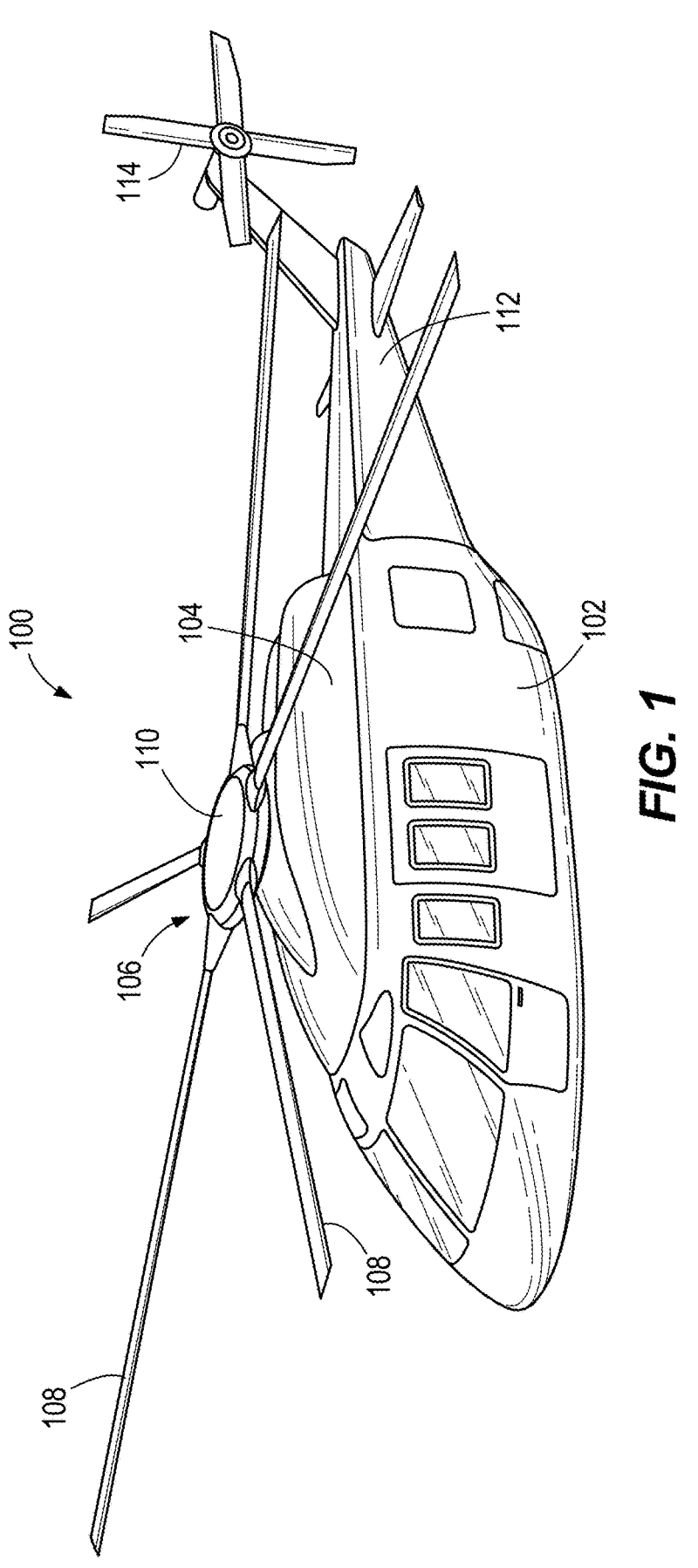
FIG. 1 is an isometric view of an aircraft, according to some embodiments.

FIG. 1 is an isometric view of an aircraft 100, according to some embodiments. In the example of FIG. 1, the aircraft 100 is a helicopter. The aircraft 100 includes a fuselage 102, which serves as the main body of the aircraft 100. The fuselage 102 houses the cockpit, passenger or cargo space, fuel tanks, and engines 104. The aircraft 100 includes a main rotor system 106 rotatably coupled to the fuselage. The main rotor system 106 includes multiple rotor blades 108 attached to a central hub 110. In various implementations, the engines 104 power the main rotor system 106 to rotate and generate lift by creating a pressure differential above and below the rotor blades 108. The aircraft 100 includes a tail boom 112 extending from the fuselage 102. The tail boom 112 supports an anti-torque device 114 at an end of the tail boom 112 opposite the fuselage 102.

Since the main rotor system 106 spins in one direction, the main rotor system 106 generates a resultant torque in the opposite direction. This resultant torque is transmitted to the fuselage 102 and would cause the fuselage 102 to spin in the opposite direction. In a conventional helicopter, this torque effect is significant and must be counteracted to maintain control of the aircraft 100. The anti-torque device 114 provides a counteracting force opposite the torque effect, which counters the torque effect produced by the main rotor system 106. By adjusting the force produced by the anti-torque device 114, the pilot can control the yaw of the aircraft 100.

In various implementations, the anti-torque device 114 includes a tail rotor, which is a small rotor mounted vertically or at an angle on the tail boom 112. The tail rotor produces thrust in a substantially horizontal plane to counteract the torque effect. By varying the pitch of the tail rotor blades, the pilot can control the amount of thrust produced, allowing for precise yaw control. In some examples, the anti-torque device 114 includes a fantail or a fan-in-fin system. The fantail system may include a shrouded fan enclosed in a housing at the end of the tail boom 112. As with the tail rotor, the pilot can control the among of thrust produced by a fantail arrangement by varying the pitch of the fan blades.

In various implementations, the anti-torque device 114 includes a no tail rotor (NOTAR) system. The NOTAR system may use a fan arranged coaxially inside of the tail boom 112 (for example, at an end of the tail boom 112 closer to the fuselage 102) to draw in air and pressurize the air through the tail boom 112. The pressurized air is expelled through Coandă slots and/or through louvres or a directional nozzle at the end of the tail boom 112. The expelled air creates a force that opposes the torque effect produced by the main rotor system 106. The pilot can control the magnitude and/or direction of the expelled air to control the yaw of the aircraft 100.

Figure 2:
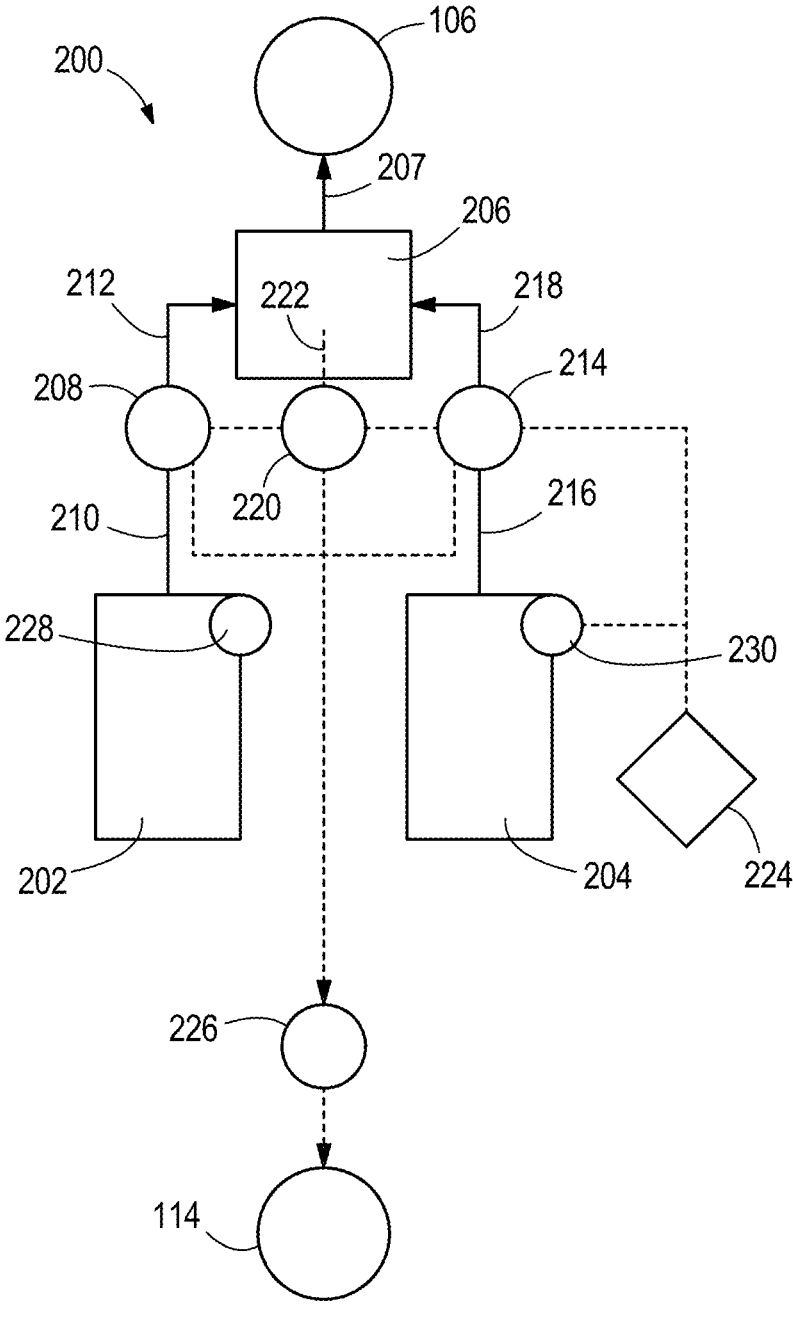
FIG. 2 is a block diagram illustrating a parallel hybrid powerplant for the aircraft of FIG. 1, according to an embodiment.

FIG. 2 is a block diagram illustrating a parallel hybrid powerplant 200 for the aircraft 100 of FIG. 1, according to an embodiment. In the example of FIG. 2, the engines 104 include a combination of one or more primary thermal engines (such as gas turbine engines) augmented by a combination of one or more secondary electric motor/generators. In the example of FIG. 2, the engines 104 include a gas turbine engine 202 and a gas turbine engine 204. The gas turbine engine 202 is coupled to a gearbox 206 with a motor/generator 208 in series between the gas turbine engine 202 and the gearbox 206. For example, the gas turbine engine 202 is mechanically connected to the motor/generator 208 via a driveshaft 210, and the motor/generator 208 is mechanically connected to the gearbox 206 via a driveshaft 212.

Similarly, the gas turbine engine 204 is mechanically connected to a gearbox 206 with a motor/generator 214 mechanically connected in series between the gas turbine engine 204 and the gearbox 206. For example, the gas turbine engine 204 is mechanically connected to the motor/generator 214 via a driveshaft 216, and the motor/generator 214 is mechanically connected to the gearbox 206 via a driveshaft 218. A motor/generator 220 is connected to the gearbox 206. For example, the motor/generator 220 may be mechanically connected to the gearset of the gearbox 206 via a driveshaft 222. In the example of FIG. 2, the motor/generator 208, motor/generator 214, and motor/generator 220 are electrically connected (for example, in parallel or in series) to a stored energy source 224, such as a battery. The motor/generator 208, motor/generator 214, and motor/generator 220 may, when operating as a motor, receive electrical power from the stored energy source 224. Similarly, the motor/generator 208, motor/generator 214, and motor/generator 220 may, when operating as a generator, provided electrical power to the stored energy source 224.

The motor/generators 208, 214, and/or 220 are electrically connected (for example, in parallel or in series) to a motor 226. In some examples, the motor 226 is electrically connected to the stored energy source 224. When operating in generator mode, the motor/generators 208, 214, and/or 220 may supply electrical power to the motor 226. In some configurations, the stored energy source 224 supplies electrical power to the motor 226. The motor 226 supplies mechanical power to the anti-torque device 114.

In various implementations, the aircraft 100 includes a cooling system for cooling the motor/generators 208, 214, and/or 220 and/or the motor 226 (and any associated controls). In some examples, the cooling system is linked to the cooling system of the gas turbine engines or the gearboxes. In various implementations, the aircraft 100 includes electrically powered flight control actuators. In some examples, the aircraft 100 includes electrically powered utility actuators.

In operation, gas turbine engine 202 provides mechanical power to the gearbox 206 via the driveshaft 210 and the driveshaft 212. Similarly, gas turbine engine 204 provides mechanical power to the gearbox 206 via the driveshaft 216 and the driveshaft 218. The gearbox 206 may include a series of gears that reduce the high-speed rotational power output from the gas turbine engines 202 and/or 204 to low-speed rotational power. The gearbox 206 provides the low-speed rotational power to the main rotor system 106 via a driveshaft 207, thus driving the main rotor system 106. When the power demand is below the available power of the gas turbine engines, the motor/generators connected to the gas turbine engines may be operated as generators. For example, when the power demand on the gas turbine engine 202 is below the available power of the engine, the gas turbine engine 202 may drive the motor/generator 208 as a generator, and the motor/generator 208 supplies electrical power to the stored energy source 224. Similarly, when the power demand on the gas turbine engine 204 is below the available power of the engine, the gas turbine engine 204 may drive the motor/generator 214 as a generator, and the motor/generator 214 supplies electrical power to the stored energy source 224.

When the power demand exceeds the available power of the gas turbine engines, the motor/generators connected to the gas turbine engines may be operated as motors to supplement the mechanical power output of the gas turbine engines. For example, when the power demand on the gas turbine engine 202 exceeds the available power of the engine, the motor/generator 208 draws electrical power from the stored energy source 224. The motor/generator 208 then converts this electrical energy into additional rotational mechanical power, which is combined with the mechanical output of the gas turbine engine 202. This additional mechanical power is transmitted through the driveshaft 212 to the gearbox 206.

Similarly, when the power demand on the gas turbine engine 204 exceeds the available power of the engine, the motor/generator 214 draws electrical power from the stored energy source 224. The motor/generator 214 then converts this electrical energy into additional rotational mechanical power, which is combined with the mechanical output of the gas turbine engine 204. This additional mechanical power is transmitted through the driveshaft 218 to the gearbox 206.

The coordinated operation between the gas turbine engines and the motor/generators enables the motor/generators to provide supplemental mechanical power during high-demand conditions, such as takeoff, hover, rapid maneuvering, and emergency situations. This supplementary power allows the gas turbine engines to be optimized for efficient operation during cruise, where the power requirements are lower. As a result, the gas turbine engines can be downsized by an amount in a range of between about 20% and about 40% compared to the engines used in a conventional aircraft. This downsizing not only improves fuel efficiency during cruise (for example, by ensuring the engines operate closer to their optimal power output) but also reduces overall engine weight (further increasing efficiency) and maintenance costs. Aircraft 100 implementing the hybrid power-plants described herein may have about a 15% greater range, be about 15% more fuel efficient, have about a 30% reduction in hourly direct operating cost, and/or have about a 20% reduction in cost per seat mile than comparable conventional aircraft.

In operation, the gearbox 206 may drive the motor/generator 220 (for example, via driveshaft 207), and the motor/generator 220 may operate as a generator. The motor/generator 220 may supply electrical power to the stored energy source 224 and/or the motor 226. In the example of FIG. 2, each gas turbine engine may also include a motor/generator that starts the engine and/or powers engine accessories and/or electrical systems of the aircraft 100. The gas turbine engine 202 is equipped with a motor/generator 228, and the gas turbine engine 204 is equipped with a motor/generator 230. During the starting process for the gas turbine engines 202 and 204, the motor/generators 228 and 230 operate as motors, drawing electrical power from the stored energy source 224. The motor/generator 228 converts the electrical energy into rotational mechanical energy, spinning the turbines of the gas turbine engine 202, and the motor/generator 230 converts the electrical energy into rotational mechanical energy, spinning the turbines of the gas turbine engine 204. After the turbines reach the required speed, fuel is introduced into the combustion chamber of each engine and ignited, starting the combustion process.

In various implementations, the motor/generator 220 functions as a motor and converts electrical power from the stored energy source 224 into rotational mechanical power, which it supplies to the main rotor system 106 via the driveshaft 222 and the gearbox 206. In some examples, the motor/generators 208, 214, and/or 220 are singly redundant but provide system-level triple redundancy. For example, the motor/generators may be sized so that even when one or two of the motor/generators fail, the remaining motor/generator (s) can supply the necessary power to the main rotor system 106. In various implementations, when the motor/generator 208 fails, motor/generators 214 and 220 supply the necessary power to the main rotor system 106 and/or electrical power to the motor 226. In some examples, when the motor/generator 214 fails, motor/generators 208 and 220 supply the necessary power to the main rotor system 106 and/or electrical power to the motor 226.

After the gas turbine engines 202 and 204 are running, the motor/generators 228 and 230 can function as generators. In this mode, they convert rotational mechanical power from their respective gas turbine engine into electrical power. This electrical power is used to supply the electrical power systems of the aircraft 100, including engine accessories, avionics, main rotor system 106 actuators, anti-torque device 114 actuators, etc.

Figure 3:
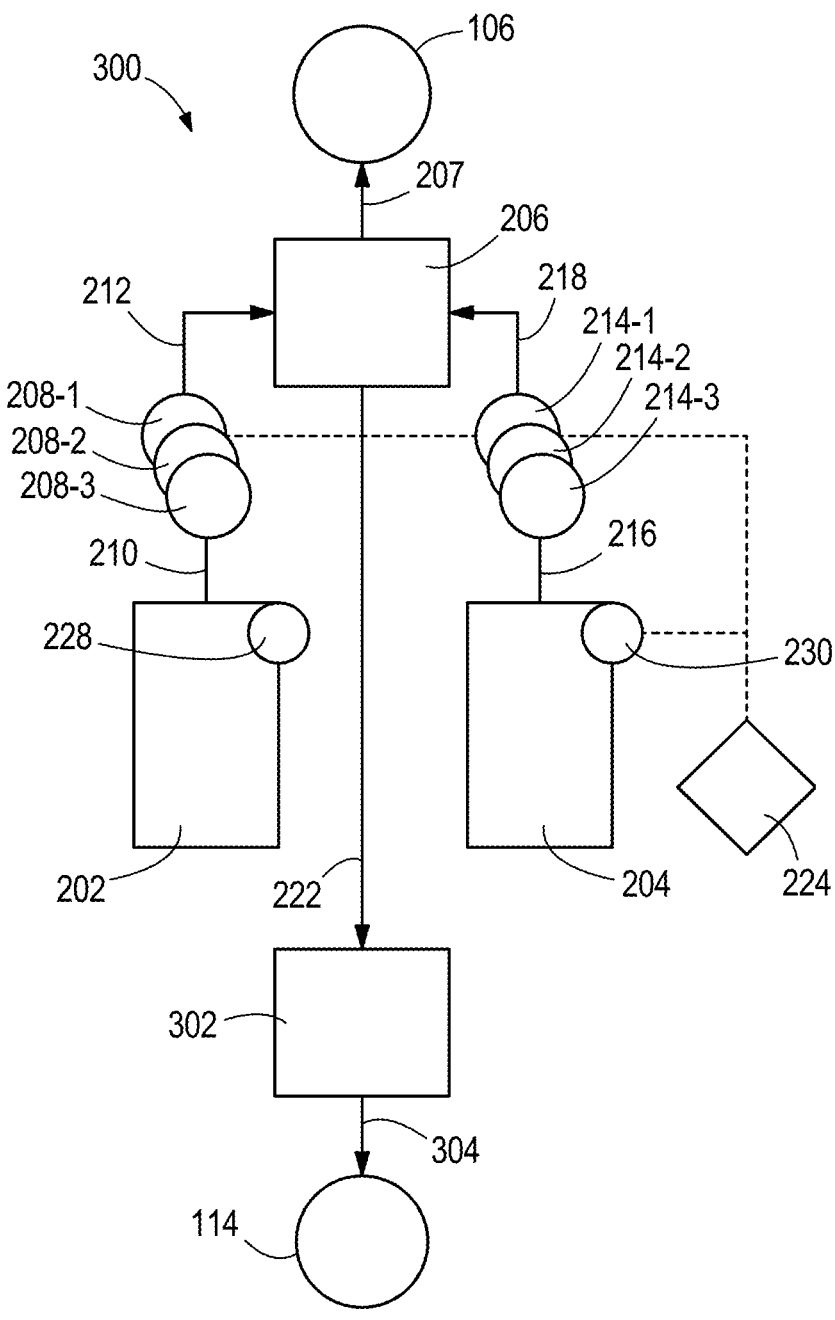
FIG. 3 is a block diagram illustrating a parallel hybrid powerplant for the aircraft of FIG. 1, according to an embodiment.

FIG. 3 is a block diagram illustrating a parallel hybrid powerplant 300 for the aircraft 100 of FIG. 1, according to an embodiment. The example of FIG. 3 is substantially similar to the example of FIG. 2. However, in the example of FIG. 3, the motor/generator 208 of FIG. 2 is replaced with triple-redundant motor/generators 208-1, 208-2, and 208-3, and the motor/generator 214 of FIG. 2 is replaced with triple-redundant motor/generators 214-1, 214-2, and 214-3. In various implementations, the motor/generators 208-1, 208-2, and 208-3 are connected in series between the gas turbine engine 202 and the gearbox 206, and the motor/generators 214-1, 214-2, and 214-3 are connected in series between the gas turbine engine 204 and the gearbox 206. In some examples, the motor/generators 208-1, 208-2, and 208-3 are connected in parallel between the gas turbine engine 202 and the gearbox 206, and the motor/generators 214-1, 214-2, and 214-3 are connected in parallel between the gas turbine engine 204 and the gearbox 206.

The use of triple-redundant motor/generators for each gas turbine engine provides significant benefits in terms of reliability and safety. In normal operation, the powerplant 300 can be configured in a number of different ways depending on mission requirements and/or operational conditions. For example, the powerplant 300 can be configured so that only one motor/generator from each set (e.g., motor/generators 208-1, 208-2, and 208-3 for gas turbine engine 202, and motor/generators 214-1, 214-2, and 214-3 for gas turbine engine 204) runs during normal operation, with the other motor/generators remaining on standby. This configuration ensures that if the operating motor/generator fails, one of the standby motor/generators can take over, maintaining continuous power supply and preventing any disruption to flight operations.

In other configurations, all three motor/generators in each set may run simultaneously during normal operation to provide maximum power output and efficiency. This configuration ensures that the power demand is met with a balanced load distribution among the motor/generations, enhancing their longevity and reducing wear and tear. If one of the motor/generators fails while all three are operating, the remaining motor/generators can continue to provide sufficient power, ensuring uninterrupted operation. These redundancies are particularly beneficial during critical, high-demand flight phases such as takeoff, hover, landing, and engine failure, where the need for consistent and reliable power is important.

In the example of FIG. 3, the motor/generator 220 and the motor 226 of FIG. 2 are omitted, and the driveshaft 222 connects the gearbox 206 to a gearbox 302. The gearbox 302 is connected to the anti-torque device 114 via a driveshaft 304. Thus, in operation, the gas turbine engine 202, gas turbine engine 204, motor/generators 208-1-208-3, and/or motor generators 214-1-214-3 may transmit rotational mechanical power to the gearbox 206, and the gearbox 206 transmits rotational mechanical power to the gearbox 302 via the driveshaft 222. The gearbox 302 may increase or decrease the speed of the rotational mechanical power (and reducing or increasing the corresponding torque) received via the driveshaft 222 and transmit the rotational mechanical power to the anti-torque device 114 via the driveshaft 304.

Figure 4:
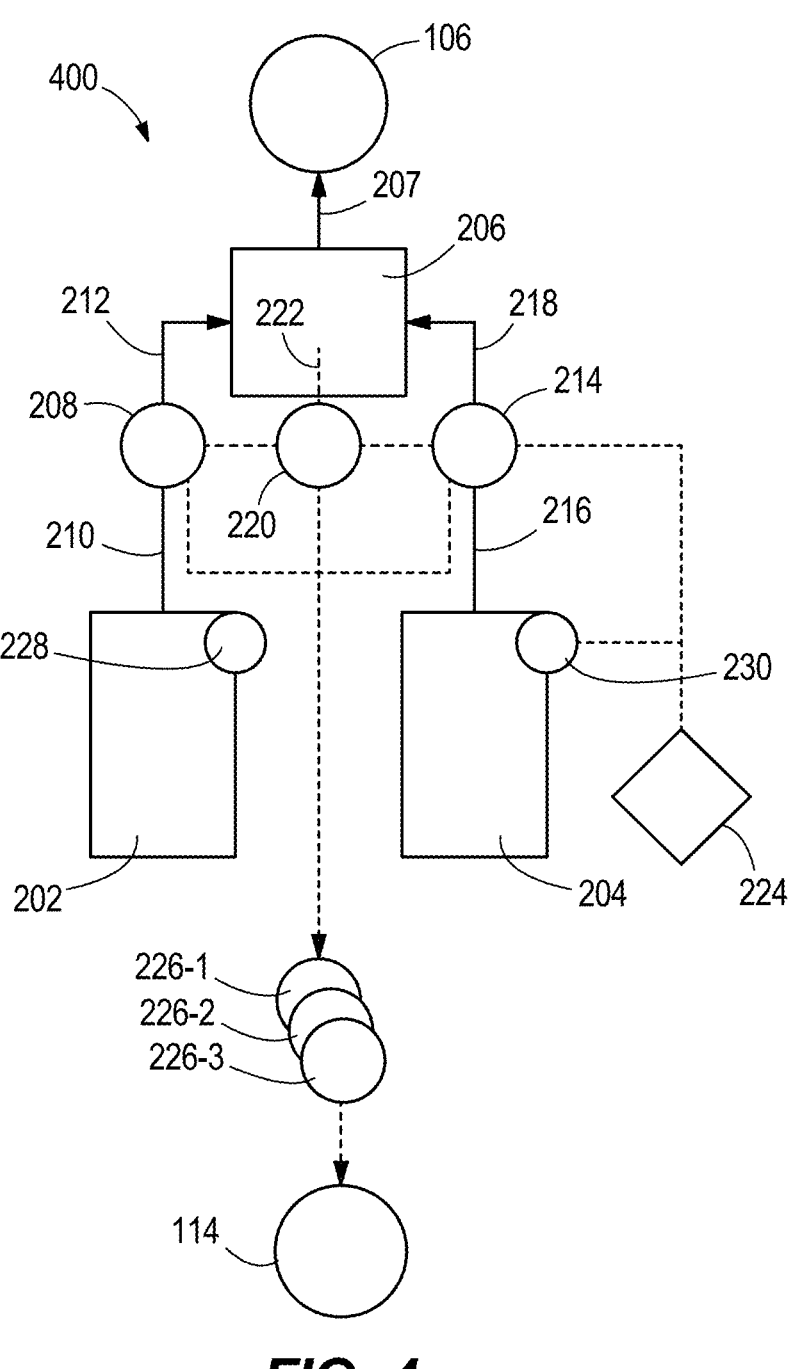
FIG. 4 is a block diagram illustrating a parallel hybrid powerplant for the aircraft of FIG. 1, according to an embodiment.

FIG. 4 is a block diagram illustrating a parallel hybrid powerplant 400 for the aircraft 100 of FIG. 1, according to an embodiment. The example of FIG. 4 is substantially similar to the example of FIG. 2. However, in the example of FIG. 4, the motor 226 of FIG. 2 is replaced with triple-redundant motors 226-1, 226-2, and 226-3.

As with the example of FIG. 3, the introduction of triple-redundant motors provides significant benefits in terms of operational reliability and system redundancy. In normal operation, the powerplant 400 can be configured to use these motors in different ways depending on the specific requirements and flight conditions. For instance, in some configurations, only one of the motors 226-1, 226-2, or 226-3 may operate during normal flight, while the others remain on standby. This setup ensures that if the operating motor fails, one of the standby motors can immediately take over, preventing any loss of control and maintaining the stability of the aircraft 100.

In other configurations, all three motors 226-1, 226-2, and 226-3 may operate simultaneously during high-demand situations to provide maximum power and redundancy. By distributing the load among the three motors, the powerplant 400 enhances the efficiency of and reduces the strain on each individual motor, thereby prolonging their operational lifespan. If one motor fails while all three are running, the remaining two motors can still provide adequate power to the anti-torque device, ensuring uninterrupted control. These redundancies may ensure consistent power delivery to the anti-torque device (which may be essential for maintaining aircraft stability) even in the event of a failure of one of the motors.

Figure 5:
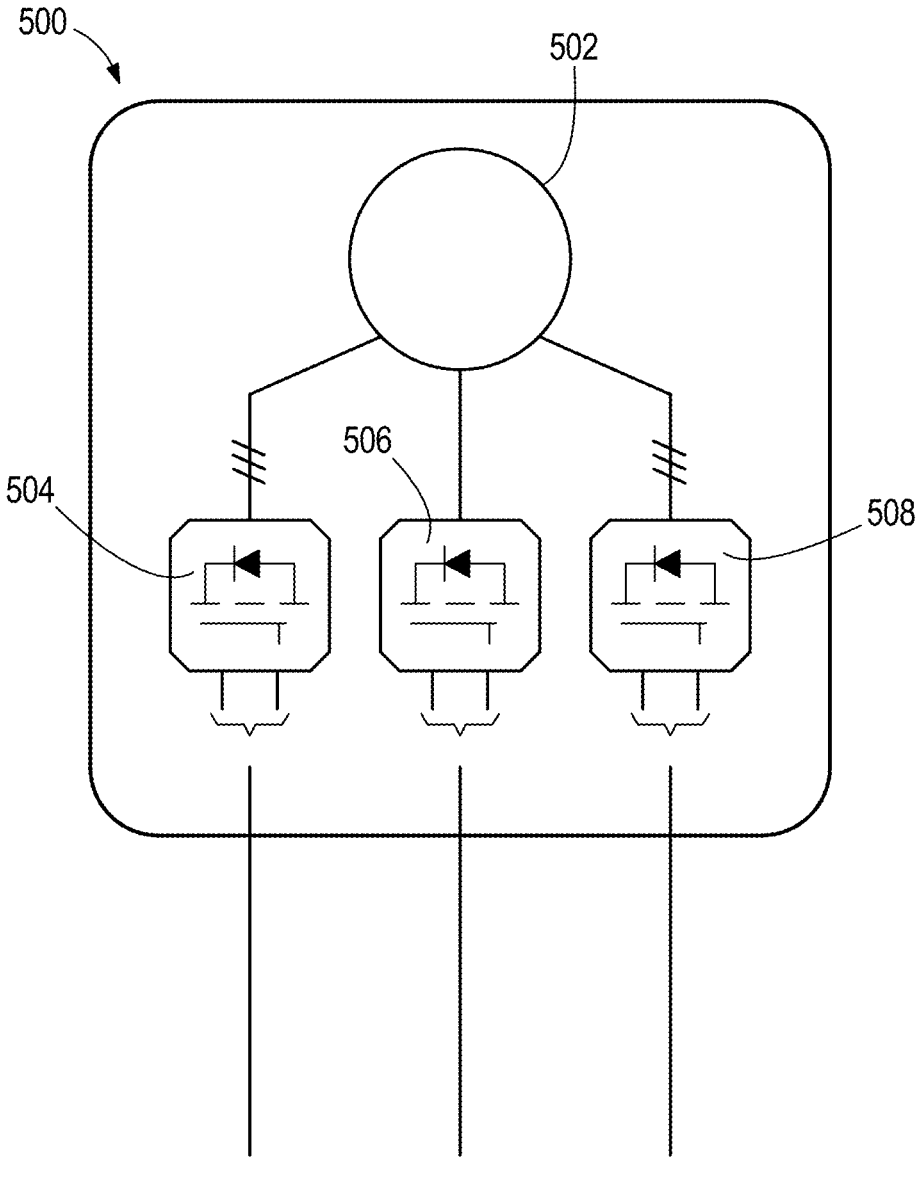
FIG. 5 is a schematic illustration of an example motor.

FIG. 5 is a schematic illustration 500 of an example motor 502, according to some embodiments. The motor 502 may be a direct current (DC) motor, such as, for example, a brushless DC motor (BLDC), a permanent magnet synchronous motor (PMSM), an asynchronous (or induction) motor, a switched reluctance motor (SRM), etc. In the example of FIG. 5, the motor 502 includes triple-redundant channels. Each channel may be an electrical pathway responsible for delivering electrical power to the windings of the motor 502. Each channel includes an inverter/converter/controller (ICC). In the example of FIG. 5, the channels include an ICC 504, an ICC 506, and an ICC 508, respectively.

Each ICC may perform three main functionalities: inverting electrical power, converting electrical power, and controlling the operation of the motor 502. The ICC may invert electrical power by converting DC power from the stored energy source 224 into alternating current (AC). For example, the ICC may use high-speed switching such as a Silicon Carbide Metal-Oxide Semiconductor Field-Effect Transistors (SiC MOSFETs) to change DC power from the energy stored energy device 244 into three-phase AC power for driving the motor 502. The ICC may convert AC power generated by the motor 502 (when functioning as a generator) back into DC power for recharging the stored energy device 244 and/or powering other devices of the aircraft 100. The ICC may also control the operation of the motor 502 and coordinate the bi-directional power flow between the motor 502 and the energy storage device 244, other motors, and other electrical components. For example, the ICC may regulate the motor speed, torque, and/or power output of the motor 502 based on inputs from a flight control computer (FCC) and/or various sensors.

In normal operation, the channels operate in parallel. However, including three channels means that in the event that one or two of the channels fail, the remaining channels continue to control the motor 502, ensuring reliable operation. In the event of a channel failure, the current delivered through the failed channel is redistributed between the remaining channels. Accordingly, the windings of the motor 502 are sized to handle the increased current requirements of channel failure. In various implementations, the motor/ generators 208, 208-1, 208-2, 208-3, 214, 214-1, 214-2, 214-3, and/or 220, and or the motors 226, 226-1, 226-2, and/or 226-3 are implemented according to FIG. 5.

Figure 6:
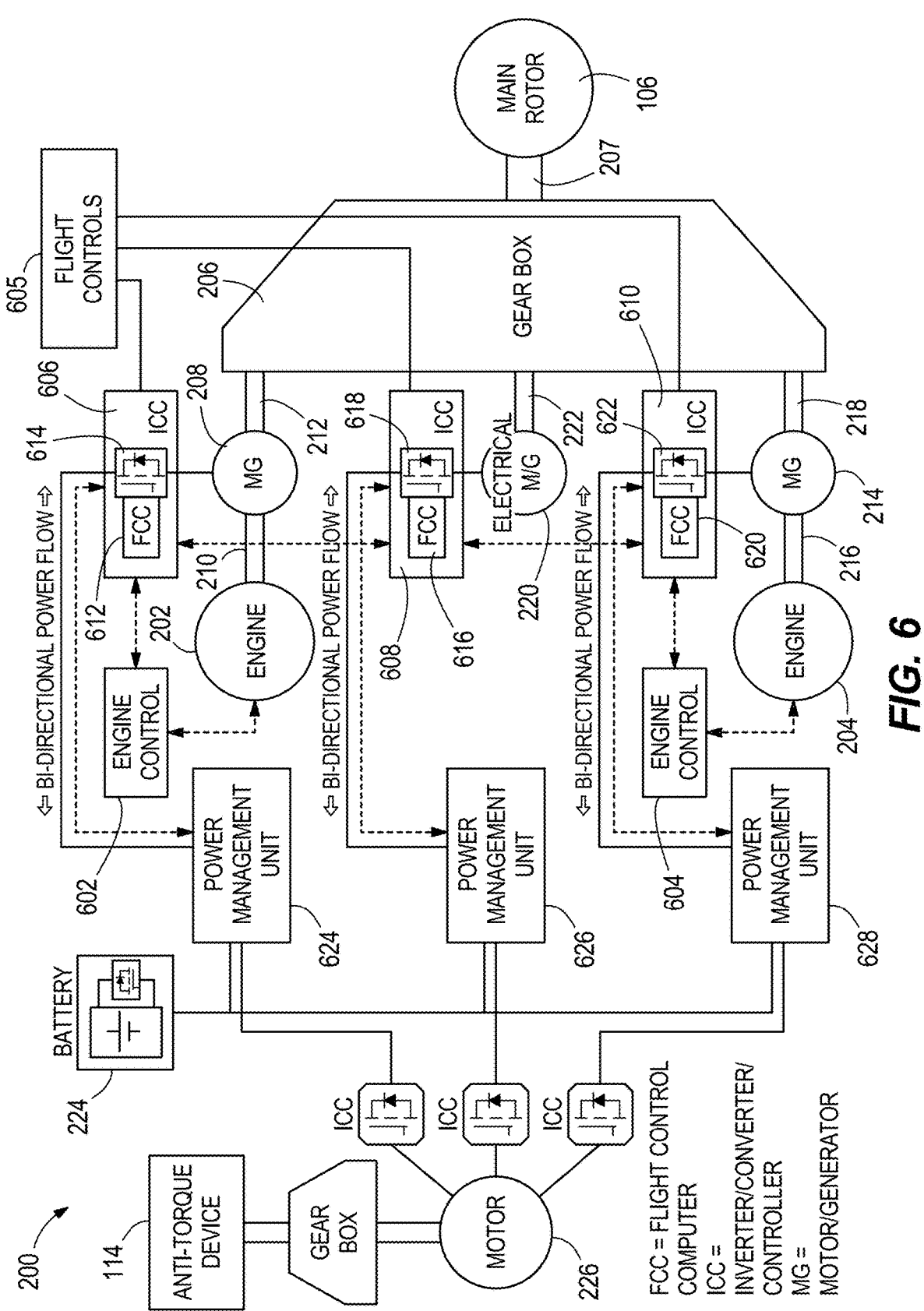
FIG. 6 is a block diagram illustrating additional details associated with the hybrid powerplant of FIG. 2.

FIG. 6 is a block diagram illustrating additional details associated with the hybrid powerplant 200 of FIG. 2, according to an embodiment. In various implementations, each gas turbine engine includes a controller such as an engine control. Suitable examples of engine controls include full authority digital engine controls (FADECs). In the example of FIG. 6, the gas turbine engine 202 includes an engine control 602 and the gas turbine engine 204 includes an engine control 604. Each engine control may provide comprehensive control over the operation of the respective gas turbine engine. Each gas turbine engine may include temperature sensors, pressure sensors, speed sensors, flow sensors, position sensors, vibration sensors, pressure ratio sensors, and/or air/fuel ratio sensors.

Temperature sensors include turbine inlet temperature (TIT) sensors that measure the temperature of gases entering the gas turbine engine, exhaust gas temperature (EGT) sensors that measure the temperature of exhaust gases leaving the gas turbine engine, and/or compressor inlet temperature (CIT) sensors that measure the temperature of air entering the compressor stage of the gas turbine engine. Pressure sensors include compressor discharge pressure (CDP) sensors that measure the pressure of air exiting the compressor stage, fuel pressure sensors that monitor the pressure of fuel supplied to the gas turbine engine, and/or oil pressure sensors that measure the pressure within the gas turbine engine's lubrication system.

Speed sensors include high-pressure turbine speed (N2) sensors that measure the rotational speed of the high-pressure turbine stage of the gas turbine engine, low-pressure turbine speed (N1) sensors that measure the rotational speed of the low-pressure turbine stage of the gas turbine engine, and/or engine speed (RPM) sensors that measure the overall rotational speed of the gas turbine engine. Flow sensors include fuel flow sensors that measure the rate of fuel flow the gas turbine engine and/or air flow sensors that measure the rate of airflow entering the gas turbine engine. Position sensors include throttle position sensors that measure the position of the throttle of the gas turbine engine, variable stator vane (VSV) position sensors that monitor the position of the variable stator vanes in the compressor stage of the gas turbine engine.

Vibration sensors include vibration sensors that detect and monitor vibrations within the gas turbine engine to identify potential mechanical issues. Pressure ratio sensors include engine pressure ratio (EPR) sensors that measure the ratio of gas turbine engine exhaust pressure to inlet pressure. Air/fuel ratio sensors include oxygen sensors that measure the oxygen content in the exhaust gases to monitor and control the air/fuel ratio of the gas turbine engine.

In various implementations, the engine controls continuously process data from the various sensors and makes real-time adjustments to optimize performance of the respective gas turbine engine. For example, the engine control can regulate fuel flow to control the power output of the gas turbine engine. The engine may adjust the fuel valves based on inputs from the fuel pressure and/or fuel flow sensors, ensuring that the gas turbine engine generates the required power for different conditions such as takeoff, hover, cruise, etc.

The engine control can manage air intake to adjust the power output of the gas turbine engine. For example, when the gas turbine engine's power output is low, the helicopter rotor speed will droop, and the gas turbine engine's power turbine speed will be below a setpoint RPM. The aircraft control system and FADEC typically responds by controlling valves in the fuel metering unit to add fuel to the combustors in the gas turbine, which will maintain the speed of the gas turbine. The gas turbine will then draw more mass flow through the engine thus increasing power provided by the power turbine.

In various implementations, the engine control determines the power available from the gas turbine engine for various power ratings or power settings. Examples of power ratings or power settings include takeoff power, maximum continuous power, OEI 30-second power, OEI 2-minute power, and OEI continuous power. The engine control continuously monitors data from the various sensors described above. This real-time sensor data provides an accurate representation of the current operating conditions of the gas turbine engine and the external environment. The engine control may reference performance maps stored in its memory. These performance maps contain detailed information about the optimum power setting for the gas turbine engine under various conditions and operational modes (such as for takeoff, maximum continuous power, and OEI scenarios). The engine control may compare the real-time sensor data with the performance maps and identify the corresponding power setting that matches the monitored conditions.

The hybrid powerplant 200 includes one or more power/ controller interface units (PCIUs). Each PCIU includes an FCC and an ICC. PCIUs may provide a unified interface for controlling both gas turbine engines and/or motor/generators. Thus, the PCIUs coordinate the overall operation of the hybrid powerplant 200, ensuring seamless interaction between the gas turbine engines and the motor/generators. The PCIUs may be electrically connected to flight controls 605. The flight controls 605 may generate control signals based on pilot inputs to the flight controls. The FCC receives the control signals and communicates with the engine controls to manage the power output of the gas turbine engines and/or communicates with the ICC to manage the power output of the motor/generators. For example, the FCC determines a power demand from the main rotor system 106 based on the control signals and sends commands to the engine controls to adjust the power output of the gas turbine engines and/or sends commands to the ICC to adjust the power output of the motor/generators.

In the example of FIG. 6, the hybrid powerplant 200 includes triple redundant PCIUs. The hybrid powerplant 200 includes a PCIU 606, a PCIU 608, and a PCIU 610. The PCIU 606 includes an FCC 612 and an ICC 614. The PCIU 608 includes an FCC 616 and an ICC 618. The PCIU 610 includes an FCC 620 and an ICC 622. Each PCIU is electrically connected to a power management unit. In the example of FIG. 6, the hybrid powerplant 200 includes triple redundant power management units. The PCIU 606 is electrically connected to a power management unit 624, the PCIU 608 is electrically connected to a power management unit 626, and the PCIU 610 is electrically connected to a power management unit 628. The power management units 624, 626, and 628 are electrically connected in parallel to the stored energy source 224.

Thus, the stored energy source 224, power management unit 624, PCIU 606, and motor/generator 208 form a first electrical power distribution pathway or electrical bus, the stored energy source 224, power management unit 626, PCIU 608, and motor/generator 220 form a second electrical power distribution pathway or electrical bus, and the stored energy source 224, power management unit 628, PCIU 610, and motor/generator 214 form a third electrical power distribution pathway or electrical bus. Each PCIU monitors and maintains a set bus voltage for the respective electric bus. For example, each electric bus includes a voltage sensor and the respective PCIU maintains the bus voltage between a lower voltage threshold and a higher voltage threshold.

The PCIUs may also control the bidirectional flow of AC and DC power through the respective ICCs. For example, the PCIU may control the respective ICC to receive stored DC electrical power from the stored energy source 224, convert the DC electrical power to AC electrical power, and supply the AC electrical power to the respective motor/generator. The PCIU may control the respective ICC to receive generated AC electrical power from the respective motor/generator, convert the AC electrical power to DC electrical power, and provide the generated DC electrical power on the respective electrical bus.

In various implementations, when power demand of the main rotor system 106 is below a threshold, one or more of the PCIUs operates the respective motor/generator(s) as a generator to recharge the stored energy source 224. In some examples, each electrical bus (e.g., the stored energy source 224, power management unit, PCIU, and motor/generator) operates at a DC voltage of about 270 volts or greater. In various implementations, the power management units perform DC/DC conversion and/or DC/AC transformations to supply lower voltage electrical power (such as about 28-volt DC power and/or about 120-volt AC power) to electrical components of the aircraft 100 that require lower voltages.

The power management units may provide three independent sources of electrical power for flight critical functions and provide circuit protection for the electrical circuits. The power management units may control respective electrical circuits via contactors and/or solid-state switches. Each power management unit may monitor the respective electrical bus for ground faults. In response to a power management unit determining that a ground fault on the respective bus occurred, the power management unit isolates the fault on the respective electrical bus and sends a signal to the PCIUs. In response to receiving the signal (indicating the ground fault on one of the electrical buses), the PCIUs reallocate flight-critical electrical loads to one or more of the other electrical buses.

Figure 7:
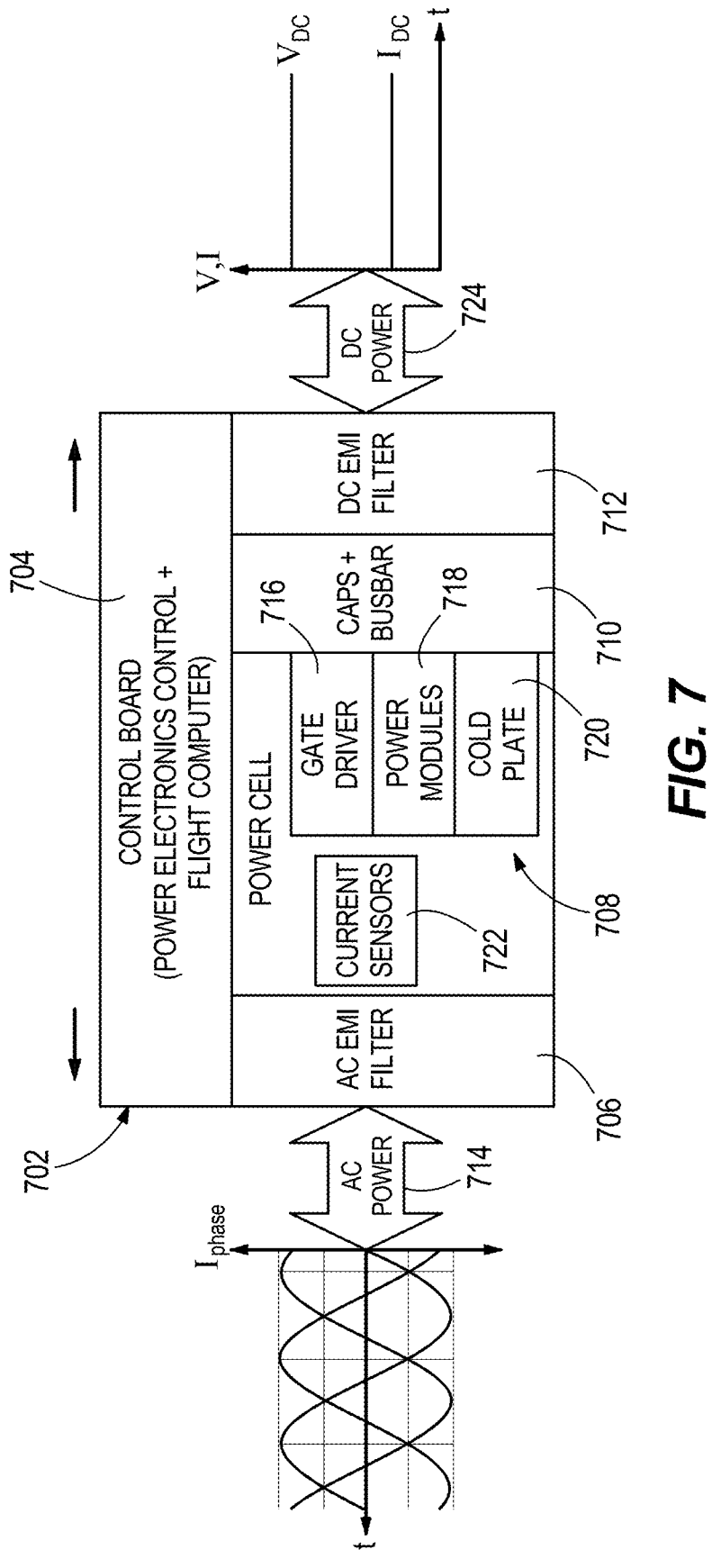
FIG. 7 is a block diagram illustrating an example power/controller interface unit, according to an embodiment.

FIG. 7 is a block diagram illustrating an example PCIU 702, according to some embodiments. In various implementations, any of the PCIUs described herein may be implemented according to the PCIU 702. The PCIU 702 includes a control board 704. The control board 704 may control the components of the PCIU 702 and implement the functionality of the FCC. The PCIU 702 includes an AC electromagnetic interference (EMI) filter 706, a power cell 708, a capacitors and busbar assembly 710, and a DC EMI filter 712. The AC EMI filter 706 receives AC power 714 (for example, from the respective power management unit) and removes unwanted noise and interference from the AC power. The AC EMI filter 706 provides clean filtered AC power to the power cell 708. The power cell 708 may include a gate driver 716, power modules 718, a cold plate 720, and current sensors 722.

The power modules 718 may receive filtered AC power from the AC EMI filter 706. The power modules 718 may include semiconductor switching devices such as insulated-gate bipolar transistors (IGBTs) or metal-oxide-semiconductor field-effect transistors (MOSFETs). The gate driver 716 may control the switching devices to convert the filtered AC power to DC power. For example, the gate driver 716 controls the switching devices within the power modules

718 to perform high-frequency rectification, converting filtered AC power to pulsating DC power by rapidly turning the switching devices on and off in synchronization with the AC waveform, allowing current to flow in only one direction.

The cold plate 720 may provide effective thermal management by absorbing heat from the power modules 718. Current sensors 722 monitor the current flowing through the power cell 708, providing feedback to the gate driver 716 and/or the control board 704, which allows the gate driver 716 and/or the control board 704 to adjust control signals sent to the power modules 718 as needed. The pulsating DC power is provided in the capacitors and busbar assembly 710. Capacitors and/or inductors in the capacitors and busbar assembly 710 may smooth the pulsating DC power to produce stable DC power. The busbar of the capacitors and busbar assembly 710 provides the stable DC power to the DC EMI filter 712. The DC EMI filter 712 may remove any remaining noise and/or interference that may have been introduced during the conversion process and outputs filtered DC power 724.

Figure 8:
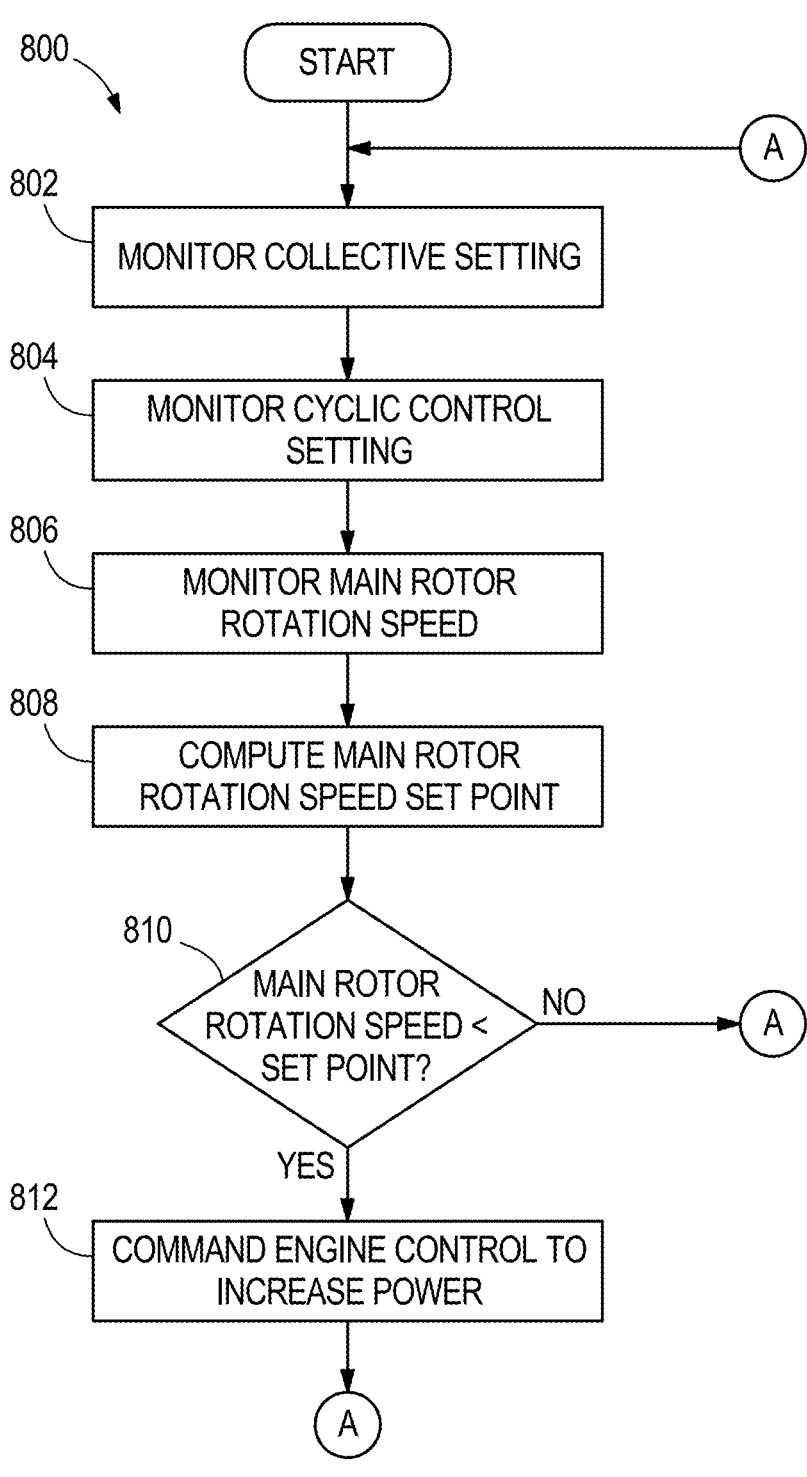
FIG. 8 is a flowchart illustrating an example process for managing a hybrid powerplant, according to an embodiment.

FIG. 8 is a flowchart illustrating an example process 800 for managing the hybrid powerplant, according to an embodiment. In the example process 800, the PCIU receives control signals from the flight controls 605. The control signals may include a collective setting and a cyclic control setting. The collective setting may by indicative of a control input (or command) from the pilot to change the pitch angle of the main rotor blades 108 (for example, simultaneously). The pilot may increase the collective setting to increase the pitch angle of the main rotor blades 108, which increases the lift generated by the main rotor system 106. The pilot may decrease the collective setting to decrease the pitch angle of the main rotor blades 108, decreasing the lift generated by the main rotor system 106. Increasing the collective setting may increase the power required by the main rotor system 106, while decreasing the collective setting may decrease the power required by the main rotor system 106.

The cyclic control setting may be indicative of a control input (or command) from the pilot to change tilt the main rotor system 106 forwards, backwards, left, or right (or any combination of directions). In the example process 800, the PCIU monitors the collective setting (at block 802). In the example process 800, the PCIU monitors the cyclic control setting (at block 804). In the example process 800, the PCIU monitors the rotation speed of the main rotor system 106 (at block 806). In the example process 800, the PCIU computes a set point for the rotation speed of the main rotor system 106 based on the main rotor collective setting and the cyclic control setting (at block 808).

The PCIU determines whether the monitored rotation speed of the main rotor system 106 is below the computed set point (at decision block 810). In response to determining that the monitored rotation speed of the main rotor system 106 is below the commanded set point ("YES" at decision block 810), the PCIU commands the engine control to increase the power output of the gas turbine engine (at block 812), and the PCIU continues monitoring the collective setting at block 802. In response to determining that the monitored rotation speed of the main rotor system 106 is not below the commanded set point ("NO" at decision block 810), the PCIU continues monitoring the collective setting at block 802.

Figure 9:
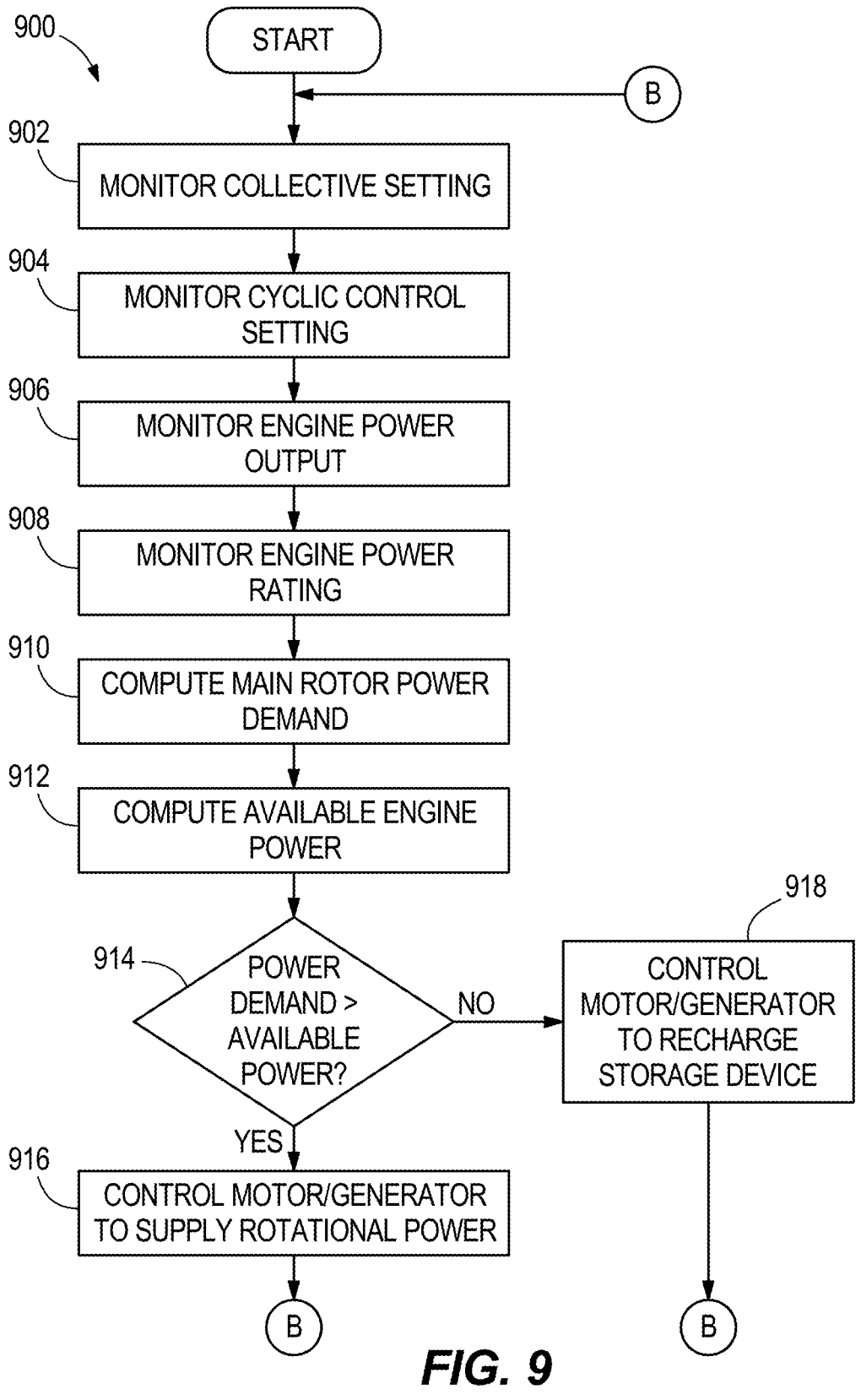
FIG. 9 is a flowchart of an example process for managing a hybrid powerplant, according to an embodiment.

FIG. 9 is a flowchart of an example process 900 for managing the hybrid powerplant, according to some embodiments. In the example process 900, the PCIU receives control signals from the flight controls 605. The control signals may include a collective setting and a cyclic control setting. In the example process 900, the PCIU monitors the collective setting (at block 902). In the example process 900, the PCIU monitors the cyclic control setting (at block 904). In the example process 900, the PCIU monitors the power output by the gas turbine engine (at block 906). For example, the engine control computes the power output by the gas turbine engine and communicates the power output to the PCIU.

In the example process 900, the PCIU monitors the engine power rating determined by the engine control (at block 908). As previously described, the engine power rating may indicate the power available from the gas turbine engine for a given scenario. In the example process 900, the PCIU computes the power demand of the main rotor system 106 (at block 910). For example, the PCIU computes the power demand based on the monitored collective setting and/or the monitored cyclic control setting. In the example process 900, the PCIU computes the available power of the gas turbine engine (at block 912). For example, the PCIU computes the available power based on a difference between the engine output and the engine power rating.

In the example process 900, the PCIU determines whether the power demand is greater than the available power (at decision block 914). In response to determining that the power demand is greater than the available power ("YES" at decision block 914), the PCIU controls the motor/generator to function as a motor and supply rotational power to the main rotor system 106 (at block 916). The PCIU continues monitoring the collective setting (at block 902). In response to determining that the power demand is not greater than the available power ("NO" at decision block 914), PCIU controls the motor/generator to function as a generator and supply electrical power to the stored energy source 224 (at block 918). The PCIU continues monitoring the collective setting (at block 902).

Figure 10:
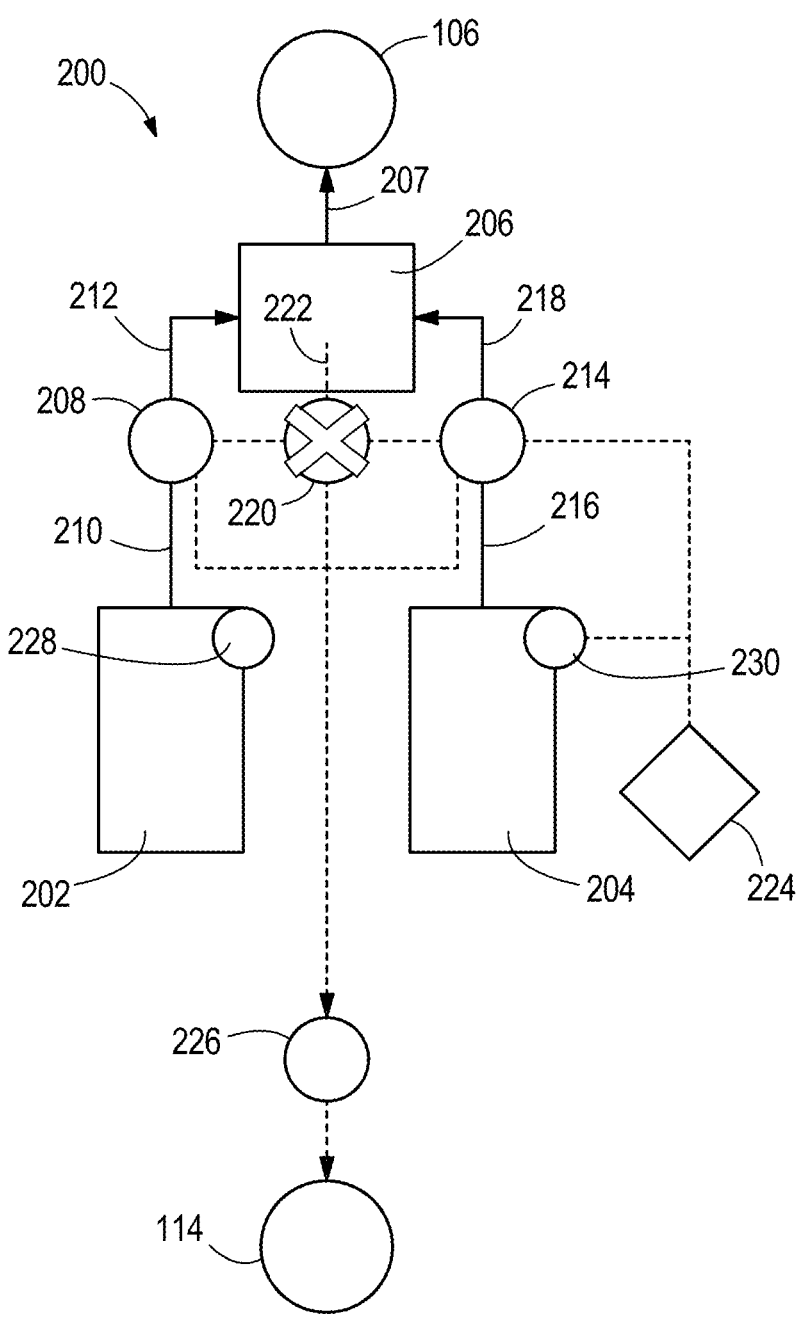
FIG. 10 is a block diagram illustrating another configuration of the parallel hybrid powerplant of FIG. 2, according to an embodiment.
Figure 11:
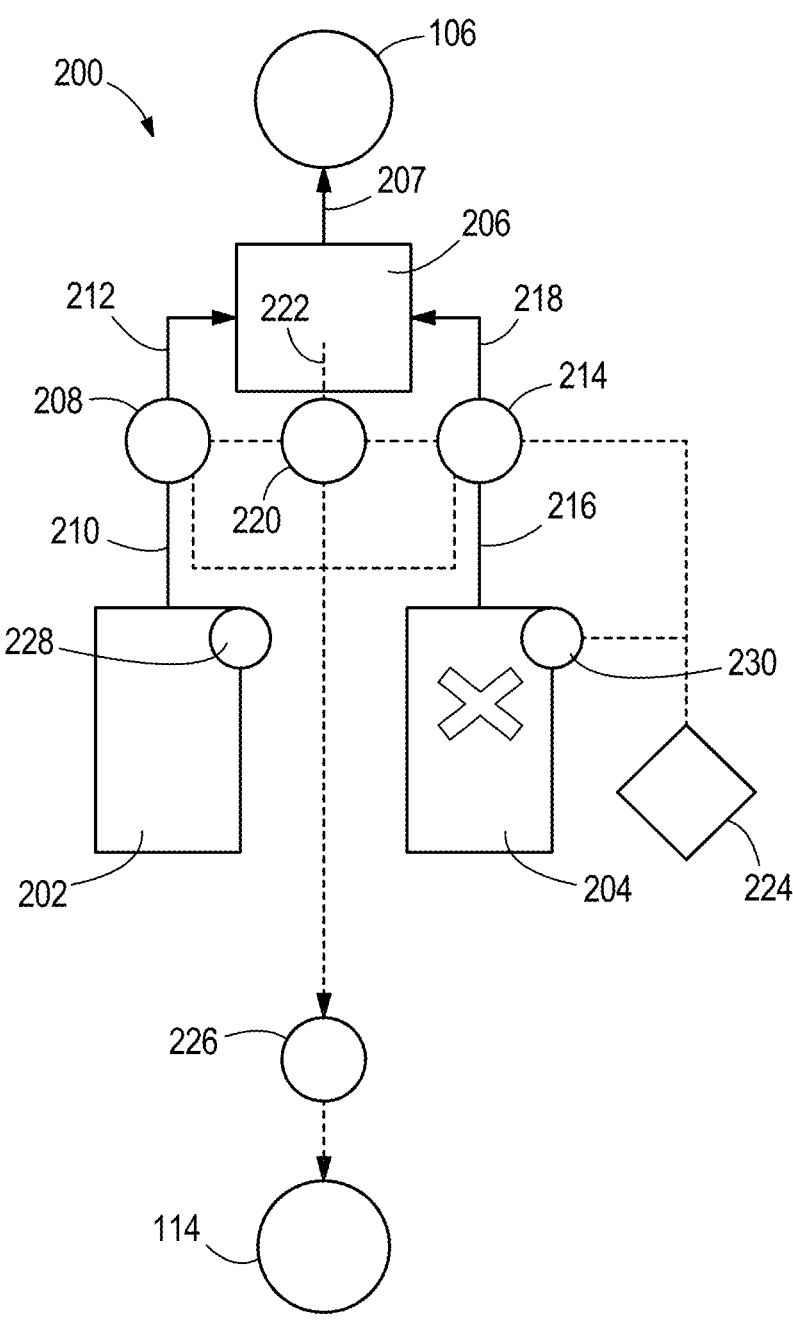
FIG. 11 is a block diagram illustrating another configuration of the parallel hybrid powerplant of FIG. 2, according to an embodiment.

FIG. 10 is a block diagram illustrating another configuration of the parallel hybrid powerplant 200 of FIG. 2, according to an embodiment. FIG. 11 is a block diagram illustrating yet another configuration of the parallel hybrid powerplant 200 of FIG. 2, according to an embodiment. Referring to FIG. 2, when the hybrid powerplant 200 is in a normal operating condition (e.g., when all components are functioning nominally) during typical hover operations, both gas turbine engines 202 and 204 and two of the motor/generators 208 and 214 function provide rotational mechanical power to the main rotor system 106. The motor/generator 220 functions as a generator and provides electrical power to the motor 226. During high-power demand mission segments (such as during takeoff, hover, climb, etc.), the PCIUs command the gas turbine engines to operate at their maximum power ratings, which minimizes the power required from the motor/generators.

FIG. 10 illustrates another configuration of the hybrid powerplant 200 where one of the motor/generators experiences a failure. In FIG. 10, the motor/generator 220 experiences a loss of power. The PCIU detects the loss of current output from the motor/generator 220 and sends a signal to the PCIUs associated with the remaining operational motor/generators (e.g., PCIU 606 associated with motor/generator 208 and PCIU 610 associated with motor/generator 214). In response to receiving the signal, the PCIUs may command one of the remaining operational motor/generators to provide rotational mechanical power to the main rotor system 106 and the remaining motor/generator to provide electrical power to the motor 226.

FIG. 11 illustrates another configuration of the hybrid powerplant 200 where one of the gas turbine engines experiences a failure. In FIG. 11, the gas turbine engine 204 experiences a loss of engine power. The gas turbine engines may be mechanically coupled to the gearbox 206 via a clutch (such as, for example, a sprag clutch). The engine control 204 and/or the PCIUs may disconnected the failed gas turbine engine 204 from the gearbox 206 by decoupling or disconnecting the clutch. The engine control 604 associated with the gas turbine engine 204 detects the loss of engine power and sends a signal to the PCIUs. In response to receiving the signal, the PCIUs send a signal to the engine control 602 associated with the operational gas turbine engine 202 to allow power settings up to the OEI 30-second, OEI 2-minute, and OEI continuous power ratings, as may be appropriate for the situation. The PCIUs send transient levels of current to the motor/generators (e.g., a higher, surge level of current) to provide motor power to the main rotor system 106.

Figure 12:
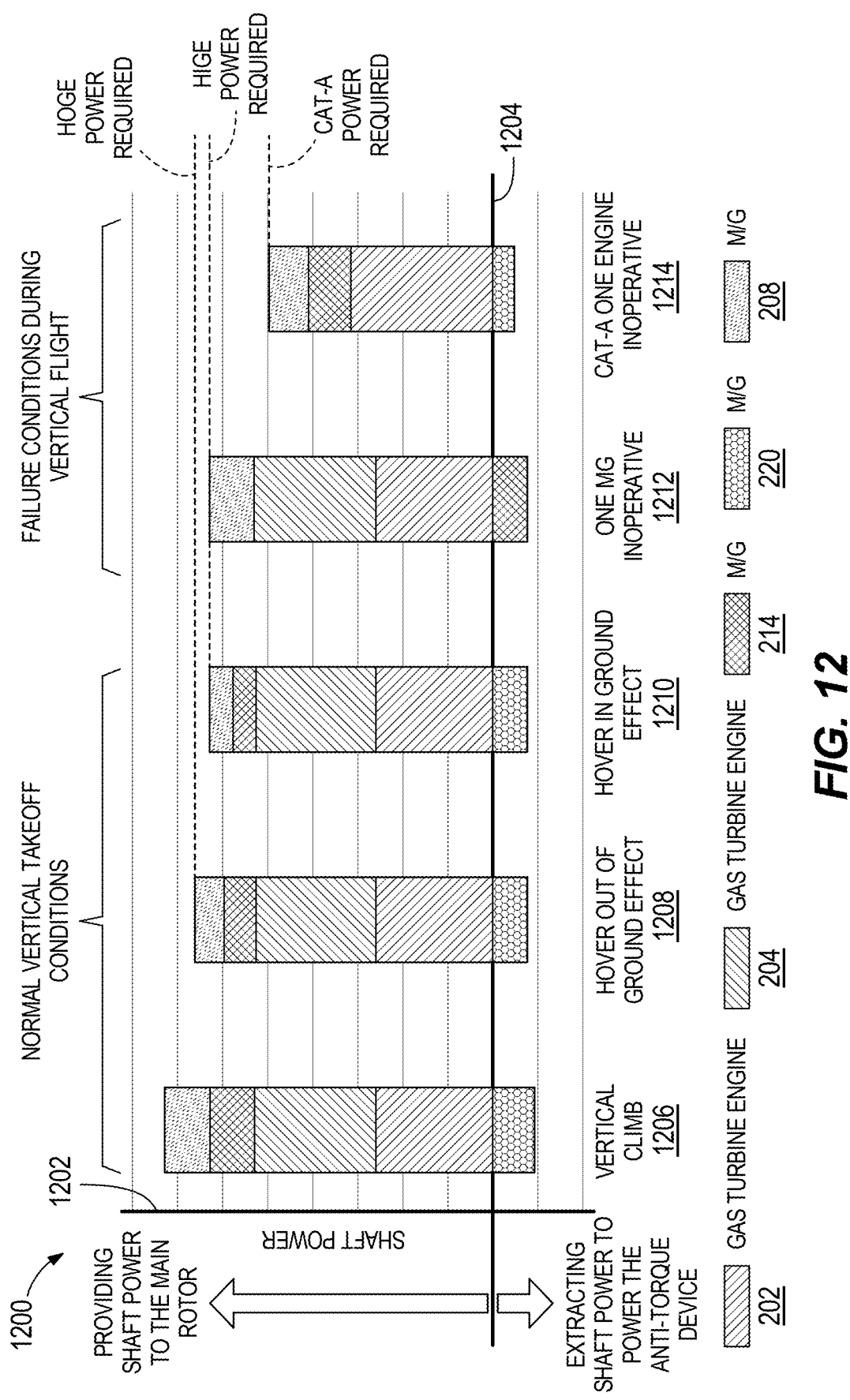
FIG. 12 is a chart illustrating a distribution of shaft power provided to a main rotor system and an anti-torque device of an aircraft under various flight conditions, according to an embodiment.

FIG. 12 is a chart 1200 illustrating the distribution of shaft power provided to the main rotor system 106 (e.g., the mechanical rotational power transmitted from the gearbox 206 to the main rotor system 106) and the anti-torque device 114 of the aircraft 100 under various flight conditions, according to some embodiments. The x-axis 1202 of the chart 1200 represents the various flight conditions, while the y-axis 1204 of the chart represents the amount and distribution of mechanical rotational power output from each component. The positive (e.g., upper) portion of the y-axis 1204 represents the mechanical power provided as rotational mechanical power to the main rotor system 106, while the negative (e.g., lower) portion of the y-axis 1204 represents the mechanical power used to power the anti-torque device 114. In some examples, the shaft power may represent the sum of the mechanical power provided to the main rotor system 106 by the hybrid powerplant 200.

During the vertical climb phase 1206, the PCIUs may command the gas turbine engine 202 to generate about 40% of the shaft power, the gas turbine engine 204 to generate about 40% of the shaft power, the motor/generator 208 to generate about 10% of the shaft power, the motor/generator 214 to generate about 10% of the shaft power, and the motor/generator 220 to generate power for the anti-torque device 114. During the hover out of ground effect (HOGE) phase 1208, the PCIUs may command the gas turbine engine 202 to generate about 40% of the shaft power, the gas turbine engine 204 to generate about 40% of the shaft power, the motor/generator 208 to generate about 5% of the shaft power, the motor/generator 214 to generate about 5% of the shaft power, and the motor/generator 220 to generate power for the anti-torque device 114. During the hover in ground effect (HIGE) phase 1210, the PCIUs may command the gas turbine engine 202 to generate about 40% of the shaft power, the gas turbine engine 204 to generate about 40% of the shaft power, the motor/generator 208 to generate about 2.5% of the shaft power, the motor/generator 214 to generate about 2.5% of the shaft power, and the motor/generator 220 to generate power for the anti-torque device 114.

During the one motor/generator inoperative phase 1212 (where the motor/generator 220 is inoperative), the PCIUs may command the gas turbine engine 202 to generate about 40% of the shaft power, the gas turbine engine 204 to generate about 40% of the shaft power, the motor/generator 208 to generate about 10% of the shaft power, and the motor/generator 214 to generate power for the anti-torque device 114. During the one gas turbine engine inoperative phase 1214 (where the gas turbine engine 204 is inoperative), the PCIUs may command the gas turbine engine 202 to generate about 50% to about 70% of the shaft power, the motor/generator 208 to generate about 15% of the shaft power, the motor/generator 214 to generate about 15% of the shaft power, and the motor/generator 220 to generate power for the anti-torque device 114.

ADDITIONAL ENUMERATED EXAMPLES

The following paragraphs provide examples of systems, methods, and devices implemented in accordance with this specification.

Example 1. A vertical takeoff and landing aircraft, comprising: a main rotor system; a gearbox mechanically connected to the main rotor system; a first gas turbine engine mechanically connected to the gearbox; a first electrical motor-generator mechanically connected to the first gas turbine engine and mechanically connected to the gearbox; a second electrical motor-generator mechanically connected to the gearbox; a third electrical motor electrically connected to the second electrical motor-generator and mechanically connected to an anti-torque device, the third electrical motor configured to provide mechanical power to the anti-torque device; and a plurality of power-controller interface units, wherein the plurality of power-controller interface units are configured to: during a first phase of flight, control the first gas turbine engine and the first electrical motor-generator to provide mechanical power to the gearbox, and control the second electrical motor-generator to provide electrical power to the third electrical motor.

Example 2. The vertical takeoff and landing aircraft of example 1, wherein the plurality of power-controller interface units are configured to: during a second phase of flight, control the first gas turbine engine to provide mechanical power to the gearbox, control the first electrical motor-generator to provide electrical power to a stored energy source, and control the second electrical motor-generator to provide electrical power to the third electrical motor.

Example 3. The vertical takeoff and landing aircraft of example 1, further comprising: a second gas turbine engine mechanically connected to the gearbox; and a fourth electrical motor-generator mechanically connected to the second gas turbine engine and mechanically connected to the gearbox.

Example 4. The vertical takeoff and landing aircraft of example 3, wherein the plurality of power-controller interface units are configured to: during a third phase of flight, control the first gas turbine engine, the second gas turbine engine, and the first electrical motor-generator to provide mechanical power to the gearbox, and control the fourth electrical motor-generator to provide electrical power to the third electrical motor; wherein the plurality of power-controller interface units are configured to enter the third phase of flight in response to detecting a failure at the second electrical motor-generator.

Example 5. The vertical takeoff and landing aircraft of example 3, wherein the plurality of power-controller interface units are configured to: during a third phase of flight, control the first gas turbine engine, control the first gas turbine engine, the second gas turbine engine, the first electrical motor-generator, and the second electrical motor-generator to provide mechanical power to the gearbox; wherein the plurality of power-controller interface units are configured to enter the third phase of flight in response to detecting a failure at the fourth electrical motor-generator.

Example 6. The vertical takeoff and landing aircraft of example 3, wherein the plurality of power-controller interface units are configured to: during a fourth phase of flight, control the first gas turbine engine, and the first electrical motor-generator, and the fourth electrical motor-generator to provide mechanical power to the gearbox, and control the second electrical motor-generator to provide electrical power to the third electrical motor.

Example 7. The vertical takeoff and landing aircraft of example 6, wherein the plurality of power-controller interface units are configured to enter the fourth phase of flight in response to detecting a failure at the second gas turbine engine.

Example 8. The vertical takeoff and landing aircraft of example 7, wherein the plurality of power-controller interface units are configured to: operate the first gas turbine engine at a first power rating during the first phase of flight; and operate the first gas turbine engine at a second power rating during the fourth phase of flight; wherein the second power rating is higher than the first power rating.

Example 9. The vertical takeoff and landing aircraft of example 7, wherein the plurality of power-controller interface units are configured to: operate the first electrical motor-generator at a first current level during the first phase of flight; and operate the first electrical motor-generator at a second current level during the fourth phase of flight; wherein the second current level is greater than than the first current level.

Example 10. The vertical takeoff and landing aircraft of example 1, wherein each power-controller interface unit includes a flight control computer and an integrated-converter-controller.

Example 11. The vertical takeoff and landing aircraft of example 10, wherein the flight control computer is configured to send control signals to a respective gas turbine engine to manage a power output of the respective gas turbine engine.

Example 12. The vertical takeoff and landing aircraft of example 10, wherein the flight control computer is configured to send control signals to a respective electrical motor-generator to manage a power output of the respective electrical motor-generator.

Example 13. The vertical takeoff and landing aircraft of example 1, wherein the third electrical motor includes triple-redundant integrated-converter-controllers.

Example 14. The vertical takeoff and landing aircraft of example 13, further comprising a plurality of power management units, each power management unit configured to provide electrical power from a stored energy source to a respective power-interface control unit.

Example 15. The vertical takeoff and landing aircraft of example 14, wherein each power management unit is configured to provide electrical power from a respective power-controller interface unit to the stored energy source.

Example 16. The vertical takeoff and landing aircraft of example 15, wherein each power management unit is configured to provide electrical power from the stored energy source to a respective integrated-converter-controller of the third electrical motor.

Example 17. The vertical takeoff and landing aircraft of example 16, wherein the plurality of power-controller interface units includes triple-redundant power-controller interface units.

Example 18. The vertical takeoff and landing aircraft of example 17, wherein the plurality of power management units includes triple-redundant power management units.

Example 19. The vertical takeoff and landing aircraft of example 1, wherein the first electrical motor-generator includes triple redundant electrical motors and the third electrical motor includes triple redundant electrical motors.

Example 20. The vertical takeoff and landing aircraft of example 3, wherein the first electrical motor-generator includes triple redundant electrical motor-generators and the fourth electrical motor-generator includes triple redundant electrical motor-generators.

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more processes within any given method may be executed in a different order—or processes may be executed concurrently or in combination with each other—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

Additionally, operations (such as processes, decisions, inputs, outputs, actions, messages, interactions, events, and/or any other operations) shown in the flowcharts and/or message sequence charts may be illustrated once each and in a particular order in the drawings. However, in various implementations, the operations may be reordered and/or repeated as may be suitable. In some examples, different operations may be performed in parallel, as may be appropriate.

The term computer-readable medium does not encompass transitory electrical or electromagnetic signals or electromagnetic signals propagating through a medium-such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

What is claimed is:
1. A vertical takeoff and landing aircraft, comprising:
a main rotor system;
a gearbox mechanically connected to the main rotor system;
a first gas turbine engine mechanically connected to the gearbox;

a first electrical motor-generator mechanically connected to the first gas turbine engine and mechanically connected to the gearbox;

a second electrical motor-generator mechanically connected to the gearbox;

a third electrical motor electrically connected to the second electrical motor-generator and mechanically connected to an anti-torque device, the third electrical motor configured to provide mechanical power to the anti-torque device, wherein the third electrical motor is not mechanically connected to the gearbox; and a plurality of power-controller interface units, wherein the plurality of power-controller interface units are configured to:

in a first operational mode associated with a first phase of flight, control the first gas turbine engine and the first electrical motor-generator to provide mechanical power to the gearbox, and control the second electrical motor-generator to provide electrical power to the third electrical motor.

2. The vertical takeoff and landing aircraft of claim 1, wherein the plurality of power-controller interface units are configured to:

in a second operational mode associated with a second phase of flight, control the first gas turbine engine to provide mechanical power to the gearbox, control the first electrical motor-generator to provide electrical power to a stored energy source, and control the second electrical motor-generator to provide electrical power to the third electrical motor.

3. The vertical takeoff and landing aircraft of claim 1, further comprising:

a second gas turbine engine mechanically connected to the gearbox; and a fourth electrical motor-generator mechanically connected to the second gas turbine engine and mechanically connected to the gearbox.

4. The vertical takeoff and landing aircraft of claim 3, wherein the plurality of power-controller interface units are configured to:

in a third operational mode associated with a third phase of flight, control the first gas turbine engine, the second gas turbine engine, and the first electrical motor-generator to provide mechanical power to the gearbox, and control the fourth electrical motor-generator to provide electrical power to the third electrical motor;

wherein the plurality of power-controller interface units are configured to enter the third operational mode in response to detecting a failure at the second electrical motor-generator.

5. The vertical takeoff and landing aircraft of claim 3, wherein the plurality of power-controller interface units are configured to:

in a third operational mode associated with a third phase of flight, control the first gas turbine engine, the second gas turbine engine, the first electrical motor-generator, and the second electrical motor-generator to provide mechanical power to the gearbox;

wherein the plurality of power-controller interface units are configured to enter the third operational mode in response to detecting a failure at the fourth electrical motor-generator.

6. The vertical takeoff and landing aircraft of claim 3, wherein the plurality of power-controller interface units are configured to:

in a fourth operational mode associated with a fourth phase of flight, control the first gas turbine engine, and the first electrical motor-generator, and the fourth electrical motor-generator to provide mechanical power to the gearbox, and control the second electrical motor-generator to provide electrical power to the third electrical motor.

7. The vertical takeoff and landing aircraft of claim 6, wherein the plurality of power-controller interface units are configured to enter the fourth operational mode in response to detecting a failure at the second gas turbine engine.

8. The vertical takeoff and landing aircraft of claim 7, wherein the plurality of power-controller interface units are configured to:

operate the first gas turbine engine at a first power rating in the first operational mode; and operate the first gas turbine engine at a second power rating in the fourth operational mode;

wherein the second power rating is higher than the first power rating.

9. The vertical takeoff and landing aircraft of claim 7, wherein the plurality of power-controller interface units are configured to:

operate the first electrical motor-generator at a first current level in the first operational mode; and operate the first electrical motor-generator at a second current level in the fourth operational mode;

wherein the second current level is greater than the first current level.

10. The vertical takeoff and landing aircraft of claim 1, wherein each power-controller interface unit includes a flight control computer and an integrated-converter-controller.

11. The vertical takeoff and landing aircraft of claim 10, wherein the flight control computer is configured to send control signals to a respective gas turbine engine to manage a power output of the respective gas turbine engine.

12. The vertical takeoff and landing aircraft of claim 10, wherein the flight control computer is configured to send control signals to a respective electrical motor-generator to manage a power output of the respective electrical motor-generator.

13. The vertical takeoff and landing aircraft of claim 1, wherein the third electrical motor includes triple-redundant integrated-converter-controllers.

14. The vertical takeoff and landing aircraft of claim 13, further comprising a plurality of power management units, each power management unit configured to provide electrical power from a stored energy source to a respective power-interface control unit.

15. The vertical takeoff and landing aircraft of claim 14, wherein each power management unit is configured to provide electrical power from a respective power-controller interface unit to the stored energy source.

16. The vertical takeoff and landing aircraft of claim 15, wherein each power management unit is configured to provide electrical power from the stored energy source to a respective integrated-converter-controller of the third electrical motor.

17. The vertical takeoff and landing aircraft of claim 16, wherein the plurality of power-controller interface units includes triple-redundant power-controller interface units.

18. The vertical takeoff and landing aircraft of claim 17, wherein the plurality of power management units includes triple-redundant power management units.

19. The vertical takeoff and landing aircraft of claim 1, wherein the first electrical motor-generator includes triple redundant electrical motors and the third electrical motor includes triple redundant electrical motors.

20. The vertical takeoff and landing aircraft of claim 3, wherein the first electrical motor-generator includes triple redundant electrical motor-generators and the fourth electrical motor-generator includes triple redundant electrical motor-generators.

* * * * *